US006178205B1

(12) United States Patent
Cheung et al.

(10) Patent No.: US 6,178,205 B1
(45) Date of Patent: Jan. 23, 2001

(54) VIDEO POSTFILTERING WITH MOTION-COMPENSATED TEMPORAL FILTERING AND/OR SPATIAL-ADAPTIVE FILTERING

(75) Inventors: Sen-ching S. Cheung, Fremont; David Drizen, San Jose; Paul E. Haskell, Saratoga, all of CA (US)

(73) Assignee: VTEL Corporation, Sunnyvale, CA (US)

( * ) Notice: Under 35 U.S.C. 154(b), the term of this patent shall be extended for 0 days.

(21) Appl. No.: 08/989,839

(22) Filed: Dec. 12, 1997

(51) Int. Cl.[7] ............................................ H04B 1/66
(52) U.S. Cl. ........................................... 375/240.29
(58) Field of Search .................... 348/845, 606, 348/607, 620, 699, 701, 403, 405, 413, 416, 667, 420, 448; 382/261, 263, 264, 272; 370/290; 375/240, 240.29; A04B 1/66

(56) References Cited

U.S. PATENT DOCUMENTS

| 5,475,434 | * | 12/1995 | Kim ..................................... 348/420 |
| 5,481,628 | * | 1/1996 | Ghaderi ................................ 382/261 |
| 5,502,489 | * | 3/1996 | Kim et al. ............................ 348/607 |
| 5,539,469 | * | 7/1996 | Jung ..................................... 348/413 |
| 5,598,213 | * | 1/1997 | Chung et al. ........................ 348/405 |
| 5,610,729 | * | 3/1997 | Nakajima ............................ 348/607 |
| 5,621,468 | * | 4/1997 | Kim ..................................... 348/416 |
| 5,654,759 | * | 8/1997 | Augenbraun et al. .............. 348/405 |
| 5,742,344 | * | 4/1998 | Odaka et al. ........................ 348/416 |
| 5,793,435 | * | 8/1998 | Ward et al. .......................... 348/448 |
| 5,907,370 | * | 5/1999 | Suzuki et al. ....................... 348/607 |

OTHER PUBLICATIONS

Liu, et al., "Adaptive Postprocessing Algorithms for Low Bit Rate Video Signals", *IEEE Transactions on Image Processing*, 4:7:1032–1035 (Jul., 1995).

* cited by examiner

*Primary Examiner*—Howard Britton
*Assistant Examiner*—Gims Philippe
(74) *Attorney, Agent, or Firm*—Skjerven Morrill MacPherson LLP; David T. Millers

(57) ABSTRACT

A postfiltering process for improving the appearance of a video image includes motion compensated temporal filtering and spatial adaptive filtering. For each target pixel being filtered, the temporal filtering uses multiple motion vectors and one or more pixel values for a prior frame to determine one of more reference values for the target filter. In one embodiment, a weighted average of multiple motion vectors for blocks near or containing the target pixel value provides a filter vector that points to a pixel value in the prior frame. This pixel value is a reference value for the target pixel value and is combined with the target pixel value in a filter operation. Alternatively, multiple motion vectors for blocks near or containing the target pixel value point to pixel values in the prior frame that are averaged to determine a reference value for the target pixel value. In each alternative, the weighting for the average is selected according to the position of the target pixel value. The spatial filtering determines a dynamic range of pixel values in a smaller block containing the target pixel value and a dynamic range of pixel values in a larger block containing the target pixel value. The two dynamic ranges suggest the image context of the target pixel, and an appropriate spatial filter for the target pixel is selected according to the suggested context.

31 Claims, 5 Drawing Sheets

VIDEO POSTFILTERING WITH MOTION-COMPENSATED TEMPORAL FILTERING AND/OR SPATIAL-ADAPTIVE FILTERING

REFERENCE TO MICROFICHE APPENDIX

The present specification comprises a microfiche appendix. The total number of microfiche sheets in the microfiche appendix is one. The total number of frames in the microfiche appendix is 49.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field of the Invention

This invention relates to systems for decoding video images and particularly to methods for improving decoded video image quality by removing coding artifacts and noise.

2. Description of Related Art

"Coding artifacts" are visible degradations in image quality that may appear as a result of encoding and then decoding a video image using a video compression method such as employed for the MPEG-1, MPEG-2, H.261, or H.263 standard. For example, video encoding for each of the MPEG-1, MPEG-2, H.261, and H.263 standards employs some combination of: partitioning frames of a video image into blocks; determining motion vectors for motion compensation of the blocks;

performing a frequency transform (e.g., a discrete cosine transform) on each block or motion-difference block; and quantizing the resultant transform coefficients. Upon decoding, common coding artifacts in a video image include blockiness that results from discontinuity of block-based motion compensation and inverse frequency transforms at block boundaries and "mosquito" noise surrounding objects in the video image as a result of quantization errors changing transform coefficients. Sources other than encoding and decoding can also introduce noise that degrades image quality. For example, transmission errors or noise in the system recording a video image can create random noise in the video image.

Postfiltering of a video image processes the video image to improve image quality by removing coding artifacts and noise. For example, spatial postfiltering can smooth the discontinuity at block boundaries and reduce the prominence of noise. Such spatial filtering operates on an array of pixel values representing a frame in the video image and modifies at least some pixel values based on neighboring pixel values. Spatial filtering can be applied uniformly or selectively to specific regions in a frame. For example, selective spatial filtering at a block edge (known locations within a frame) smoothes image contrast to reduce blockiness. However, spatial filtering can undesirably make edges and textures of objects in the image look fuzzy or indistinct and selective spatial filtering can cause "flashing" where the clarity of the edges of an object change as the object moves through areas filtered differently.

Temporal filtering operates on a current array of pixel values representing a current frame and combines pixel values from the current array with pixel values from one of more arrays representing prior or subsequent frames. Typically, temporal filtering combines a pixel value in the current array with pixel values in the same relative position in an array representing a prior frame under the assumption that the area remains visually similar. If noise or a coding artifact affects a pixel value in the current array but not the related pixel values in the prior frames, temporal encoding reduces the prominence of the noise or coding artifacts. A problem with temporal encoding arises from motion in the video image where the content of the image in one frame shifts in the next frame so that temporal filtering combines pixels in the current frame with visually dissimilar pixels in prior frames. When this occurs, the contribution of the dissimilar pixels creates a ghost of a prior frame in the current frame. Accordingly, temporal filtering can introduce undesired artifacts in a video image.

Postfiltering processes are sought that better remove coding artifacts and noise while preserving image features and not introducing further degradations.

SUMMARY

In accordance with the invention, a video postfiltering process includes motion compensated temporal filtering and/or spatial adaptive filtering. The motion compensated temporal filtering operates on each target pixel value in an array representing a current frame of a video image and combines each target pixel value with one or more pixel values from an array representing a prior frame. The pixel values from the prior frame alone or in combinations are sometimes referred to herein as reference values. The reference values for a target pixel in the current array are selected according to and depending on the values of a motion vector for a block containing the target pixel value and motion vectors for neighboring blocks. Using the motion vectors of neighboring blocks in the selection of reference values reduces ghosting when compared to temporal filtering without motion vectors or using only the motion vector for the block containing the target pixel.

In one embodiment of the invention, a vector (sometimes referred to herein as a filter vector) for a target pixel is determined from a weighted average of the motion vectors for the block containing the target pixel and the neighboring blocks closest to the target pixel. The weighting factors used in determining the filter vector for the target pixel depend on the position of the target pixel within a block. A pixel value for the target pixel is then filtered or combined with one or more reference values that correspond to an area of the prior frame identified by the filter vector.

An alternative embodiment of temporal filtering combines each target pixel value with pixel values from a prior frame that are in areas identified by the motion vectors for the block containing the target pixel value and neighboring blocks. The pixel values from the prior frame may be combined in a weighted average using weighting factors selected according to the position of the target pixel value within a block.

The adaptive spatial filter selects a filter operation for a target pixel according to the level of coding artifacts and the presence of important features. The level of coding artifacts depends on how well the pixel values are coded as indicated by the quantization factor. The dynamic range of the smallest coding unit, a 8×8 block in most of the standardized encoding processes, is used to estimate the amount of coding noise in the block. A large dynamic range usually indicates more noise. To reduce blurring of image features, a second dynamic range around the target pixel is computed and used in two ways. The second dynamic range indicates the shape of the filter required to avoid mixing pixels from different features together. The second dynamic range also indicates the appropriate strength of the filter. When the second dynamic range is close to the first dynamic range, the target pixel is on or near image features, and a weak filter is used. When the second dynamic range is smaller than a large first dynamic range, the target pixel is likely to be noise around the edges and a strong filter is used. Other combinations of the sizes of the dynamic ranges result in the use of other filters.

Although the temporal filtering and spatial filtering are used in combination to provide the best image quality, either may be used alone in particular embodiments of the invention.

BRIEF DESCRIPTION OF THE DRAWINGS

Use of the same reference symbols in different figures indicates similar or identical items.

DETAILED DESCRIPTION OF THE PREFERRED EMBODIMENTS

In accordance with an aspect of the invention, a video postfilter employs motion compensated temporal filtering and spatial adaptive filtering to improve image quality and remove coding artifacts. The temporal filtering uses motion vectors from multiple blocks to determine a reference value that is combined with the target pixel value being filtered. The reference value selected using multiple motion vectors better matches the target pixel value because the combination of motion vectors can better approximate motion of individual pixels than can a motion vector that indicates average motion of an entire block of pixel values. The spatial adaptive filtering uses the dynamic ranges of pixel values in blocks of different sizes to determine the visual context of the target pixel, and selects a filter for the target pixel according to the determined visual context. Such postfiltering processes improve video image quality and are applicable to any video image. However, the postfiltering processes are particularly suited for postfiltering a video image decoded in accordance with a video standard such as the well-known MPEG-1, MPEG-2, H.261, or H.263 video standard.

Figure 1:
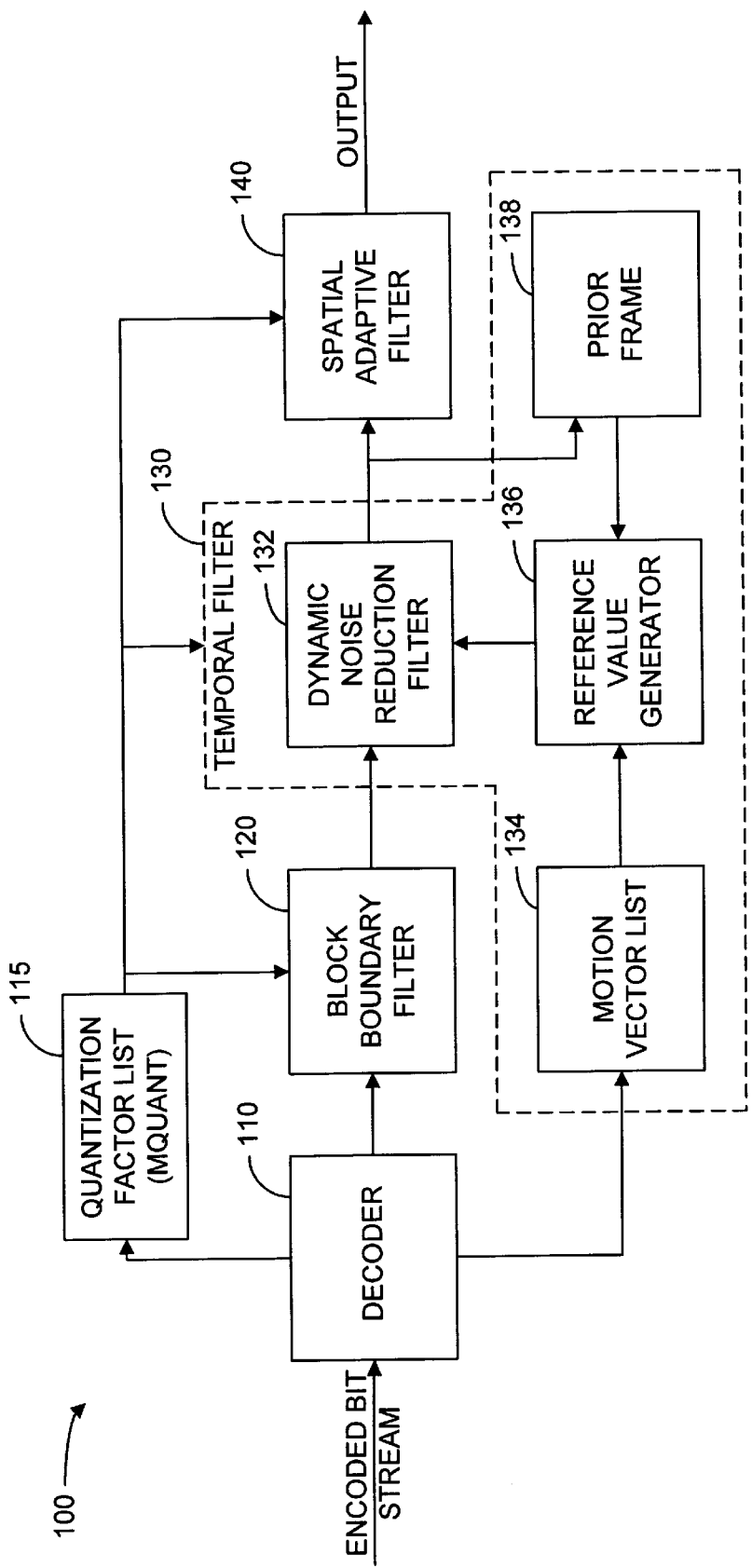
FIG. 1 shows a video decoder implementing postfiltering in accordance with an embodiment of the invention.

FIG. 1 shows a block diagram of a decoding system 100 in accordance with an exemplary embodiment of the invention. Decoding system 100 may be implemented in software executed by a general purpose computer or in specialized hardware designed to implement the specific functions of system 100 as described herein. As a specific example of an application of the invention, decoding system 100 decodes a video signal complying with the H.261 standard for video conferencing. Alternative applications will be apparent in view of this disclosure.

In accordance with the H.261 standard, three arrays of pixel values, a Y array, a U array, and a V array, represent each frame of the video image and are respectively associated with luma Y and chroma U and V of associated pixels in the frame. In the exemplary embodiment of the invention shown in FIG. 1, only the Y arrays of frames are postfiltered since the Y arrays have the greatest influence on the appearance of the video image. The Y array for a frame contains 288 rows and 352 columns of pixel values where each pixel value indicates the luma for a pixel in a standard frame size, which is 288×352 pixels for the H.261 CIF picture format. The U and V arrays each contain 144 rows and 176 columns of pixel values where each pixel value indicates U or V chroma for four pixels in the associated frame. The H.261 standard partitions each frame into 16×16-pixel areas where each area is represented by a macroblock of pixel values. Each macroblock includes one 16×16 block (or four 8×8 blocks) from the Y array, one 8×8 block from the U array, and one 8×8 block from the V array. During encoding of each macroblock in a current frame, an encoder uses a match criterion such as mean square error, mean quadratic error, or mean absolute error to search for a 16×16-pixel area in a prior frame that is visually similar to the 16×16-pixel area associated with the macroblock. A motion vector for the macroblock indicates an offset from the position of the similar area in the prior frame to the position of the associated area in the current frame. Each macroblock is then intercoded or intracoded depending on whether the search finds a good match (i.e., similar) area in the prior frame. Intercoding determines a difference block that is the difference between a block representing the area in the current frame and a block in the prior frame indicated by the motion vector, breaks the difference block into 8×8 difference blocks, and performs a discrete cosine transform (DCT) on each of the 8×8 difference blocks. Intracoding performs a discrete cosine transform on the 8×8 blocks of pixel values rather than on the difference blocks. Following intercoding or intracoding, the transform coefficients are quantized and then transmitted with motion vectors for the intercoded blocks in an encoded bit stream representing the video image.

Decoding system 100 includes a decoder 110, a block boundary filter (BBF) 120, a motion compensated temporal filter 130, and a spatial adaptive filter 140 that process an incoming bit stream complying with the H.261 standard. Decoder 110 is a conventional decoder that decodes the bit stream to generate arrays of pixel values representing decoded frames that form a video image. In the decoding, decoder 110 identifies a quantization factor MQUANT from a quantization factor list 115, dequantizes transform coefficients, performs an inverse discrete cosine transformation (IDCT) on 8×8 blocks of dequantized transformation coefficients, and for intercoded blocks, sums the resulting difference blocks with the similar blocks that the motion vectors identify in the prior frame. BBF 120, motion compensated temporal filter 130, and spatial adaptive filter 140 postfilter the decoded video image from decoder 110 to reduce noise and coding artifacts and improve image quality.

Block boundary filter 120 reduces blockiness resulting from discontinuity at the boundaries of 8×8 blocks that were subject to independent DCTs and changes the pixel values at the boundaries of the 8×8 blocks to smooth transitions across the block boundaries. Specifically, if the columns of an array of pixel values are numbered from 0 to 351, BBF 120 changes pixel values in columns 8n and 8n+7 for $0 \leq n \leq 43$; and if the rows are numbered from 0 to 287, BBF 120 changes pixel values in rows 8m and 8m+7 for $0 \leq m \leq 35$. In the exemplary embodiment of the invention, BBF 120 adapts or changes according to the quantization step size MQUANT for the block containing the pixel being filtered. For the H.261 standard, the encoded bit stream indicates the quantization step size for each encoded block. Table 1 indicates the coefficients for a five-tap horizontal filter for use on a target pixel in a column j and a three-tap vertical filter for use on a target pixel in a row i.

TABLE 1

| | Block Boundary Filter | |
|---|---|---|
| MQUANT | Horz. Filter Taps j-2, j-1, j, j + 1, j + 2 | Vertical Filter Taps i-1, i, i + 1 |
| 1 | 0, 0, 32, 0, 0 | 0, 32, 0 |
| 2 | 1, 2, 26, 2, 1 | 1, 30, 1 |
| 3 | 1, 4, 22, 4, 1 | 2, 28, 2 |
| 4 | 2, 4, 20, 4, 2 | 3, 26, 3 |
| 5 | 2, 5, 18, 5, 2 | 4, 24, 4 |
| 6 | 2, 6, 16, 6, 2 | 5, 22, 5 |
| 7 | 2, 7, 14, 7, 2 | 6, 20, 6 |
| >7 | 2, 8, 12, 8, 2 | 7, 18, 7 |

The filter coefficients for each filter in Table 1 sum to 32 so that the result of a filter operation on a target pixel value Pij is the sum of products of pixel values and filter coefficients right shifted by 5-bits (i.e., divided by 32.)

BBF 120 provides pixel values of a block-boundary-filtered frame to motion compensated temporal filter 130. Motion compensated temporal filter 130 includes a dynamic noise reduction filter 132 that combines pixel values for the current frame with reference values derived from pixel values for a prior frame 138. A reference value generator 136 determines the reference value using a list 134 of motion vectors for the current frame and the pixel values for prior frame 138.

Figure 2:
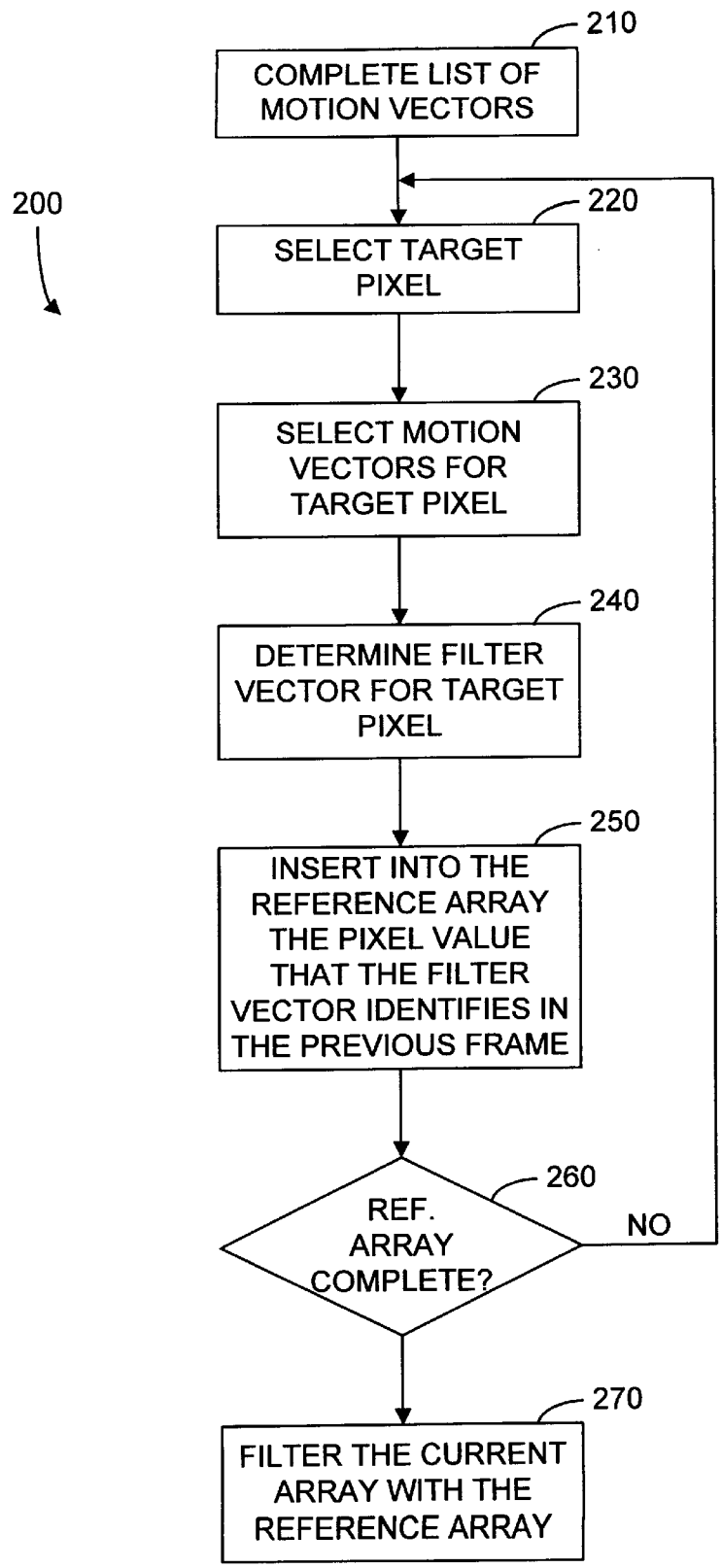
FIG. 2 shows a flow diagram for a motion compensated temporal filtering process in accordance with an embodiment of the invention.

FIG. 2 illustrates a flow diagram of a temporal filtering process 200 that filter 130 implements. An initial step 210 in process 200 completes the motion vector list 134 for the current frame. In the exemplary embodiment, decoder 110 write to list 134 the motion vectors as decoded from the incoming bit stream. Alternatively, temporal filter 130 can determine the motion vectors from the pixel values for the decoded current and prior frames, but determining motion vectors increases filter complexity. Additionally, the decoded motion vectors from decoder 110 typically provide better temporal filtering because an encoder selected encoded motion vectors using image data before compression. When the current frame is fully decoded, each macroblock not having a decoded motion vector (e.g., each intracoded macroblock) is assigned a motion vector of length zero or an illegal motion vector. Subsequent steps in process 200 skip intracoded microblocks and replace each illegal motion vector with a motion vector for a neighboring block.

Once list 134 is complete, reference value generator 136 in step 220 selects a target pixel in the current frame and identifies a macroblock containing the target pixel. A step 230 selects motion vectors for the target pixel, and a step 240 uses the selected motion vectors to determine a filter vector for the target pixel. The filter vector indicates an offset to the position of the target pixel from the position of a pixel in the prior frame that will be combined with the target pixel in a filter operation. In accordance with an aspect of the invention, the filter vector is derived using a weighted average of the motion vectors for the macroblock containing the target pixel and neighboring macroblocks. For example, Equation 1 defines a filter vector FVij for target pixel Pij in the exemplary embodiment of the invention.

$$FVij = \text{round}(Aij*MVA + Bij*MVB + Cij*MVC + Dij*MVD) \quad \text{Equation 1}$$

In Equation 1, Aij, Bij, Cij, and Dij are weighting factors, MVA, MVB, MVC, and MVD are the motion vectors selected in step 230, and round( ) is a function that rounds its argument to the nearest integer.

Figure 3:
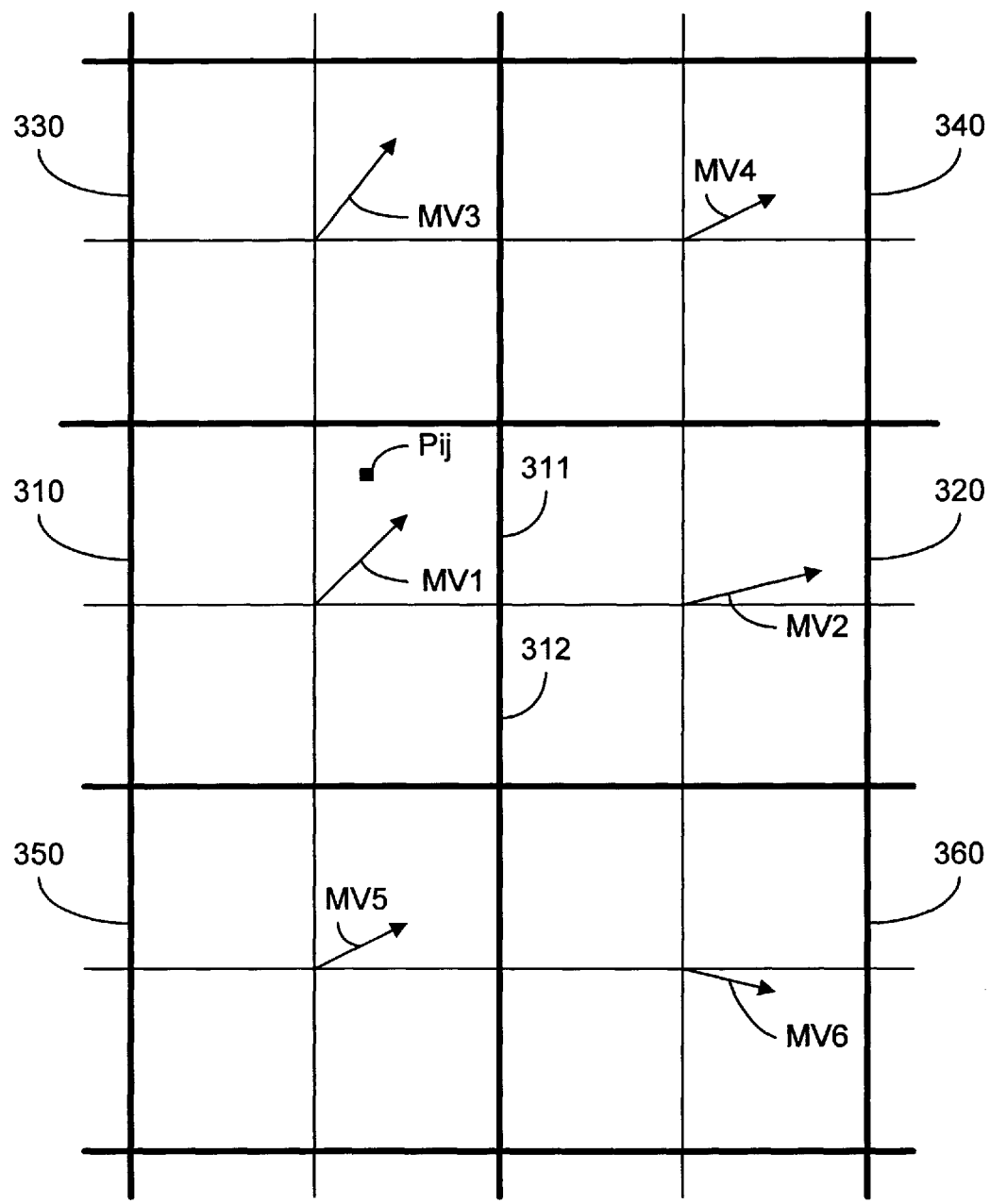
FIG. 3 illustrates motion vectors for a portion of a frame that is divided into blocks.

To illustrate the selection of motion vectors, FIG. 3 shows a portion of a current frame represented by six 16×16-pixel areas 310, 320, 330, 340, 350, and 360. Macroblocks representing areas 310, 320, 330, 340, 350, and 360 have respective motion vectors MV1, MV2, MV3, MV4, MV5, and MV6 that identify visually similar 16×16-pixel areas in the prior frame. For a specific target pixel, the motion vector for the macroblock representing the target pixel may not indicate a similar pixel in the prior frame if motion of an object including target pixel differs from the average motion for the block. The motion of the target pixel may be more like the average motion of a neighboring block rather than the block containing the target pixel. Accordingly, in the exemplary embodiment of the invention, motion vectors MVA, MVB, MVC, and MVD are respectively the motion vector for the block containing the target pixel, the motion vector for the nearest neighboring block to the right or left of the target pixel, the motion vector for the nearest neighboring block above or below the target pixel, and the motion vector for the nearest neighboring block on a diagonal relative to the block containing of the target pixel. For example, when target pixel value Pij is in an upper-right quadrant 311 of block 310 as illustrated in FIG. 3, selected motion vectors MVA, MVB, MVC, and MVD of Equation 1 are respectively motion vectors MV1, MV2, MV3, and MV4. If target pixel value Pij were in lower-right quadrant 312, the selected motion vectors MVA, MVB, MVC, and MVD would respectively be motion vectors MV1, MV2, MV5, and MV6. If a motion vector MVB, MVC, or MVD would otherwise correspond to a block beyond the edge of the frame, a block in the frame but closest to the desired block provides that motion vector.

In Equation 1, weighting factors Aij, Bij, Cij, and Dij depend on indices i and j which respectively indicate the vertical and horizontal positions of the target pixel Pij in a quadrant of a block. Indices i and j range from 1 to 8 for an 8×8 quadrant containing target pixel Pij and have minimum values near the center of 16×16 block. Equations 2 give the self contribution weighing factor Aij, the right/left neighbor weighting factor Bij, the upper/lower neighbor weighting factor Cij, and the diagonal neighbor weighting factor Dij for an exemplary embodiment of the invention.

$$Aij = (16.5-i)*(16.5-j)/256$$

$$Bij = (16.5-i)*(j-0.5)/256$$

$$Cij = (i-0.5)*(16.5-j)/256$$

$$Dij = (i-0.5)*(j-0.5)/256 \quad \text{Equations 2}$$

The weighting factors for the possible target pixel locations in an 8×8 quadrant are selected according to the likelihood that the motion of an object including target pixel Pij is similar to the motion vector associated with the weighting factor. For example, if target vector Pij is near the center of block 310, the motion of target pixel Pij is likely to be similar to motion vector MV1. Accordingly, weighting factor Aij dominates the other weighting factors when indices i and j indicate a target point near the center of block 310 (i.e., if i and j are both at or near 1.) As index j or i increases, target pixel Pij nears the boundary of block 320 or 330, and coefficient Bij or Cij increases the contribution of motion vector MV2 or MV3.

In process 200 (FIG. 2), a step 250 uses the filter vector to identify a reference value that is inserted into a reference array. The inserted value is inserted at the position corresponding to the target pixel but is from a position offset from the position of the target pixel by the amount indicated by the filter vector. Steps 220 to 250 are repeated for each pixel in the current frame until the reference array is complete in step 260. A filtering step 270 combines pixel values from the array representing the current decoded frame with reference values from the reference array. Equation 3 indicates the form of a filtering that combines target pixel value Pij for the current frame and a reference value Rij from the reference array to generate an output pixel value Oij.

$$Oij=Pij-F(Pij-Rij) \qquad \text{Equation 3}$$

Filter function F(Pij−Rij) is a function of a difference Δ between decoded pixel value Pij and the associated reference value Rij. For a large difference Δ, filter function F(Δ) is zero so that no temporal filtering is performed if reference value Rij is not a good match for decoded pixel value Pij. The filter function F(Δ) may further depend on coding parameters such as the macroblock quantization step size Q. Table 2 illustrates a filter function F(Δ,Q) suitable for the exemplary embodiment of the invention.

select three motion vectors (the motion vectors for the block containing the target pixel, the nearest neighboring block to the left or right of the target pixel, and the nearest neighboring block above or below the target pixel) or nine motion vectors (the motion vectors for the block containing the target pixel, the eight nearest neighboring blocks.) Further, determining the filter vector in step 240 can use a variety of different weighting factors or functions of the selected motion vectors and is not limited to a weighted average or particular weighting factors. Additionally, each reference value can be combined with a target pixel in a filtering operation immediately after step 240 without ever generating the reference array. Further, a variety of filter functions not limited to the form of Equation 3 described above may be employed. For example, filters can combine each target pixel with more that one reference value from the reference array.

Figure 4:
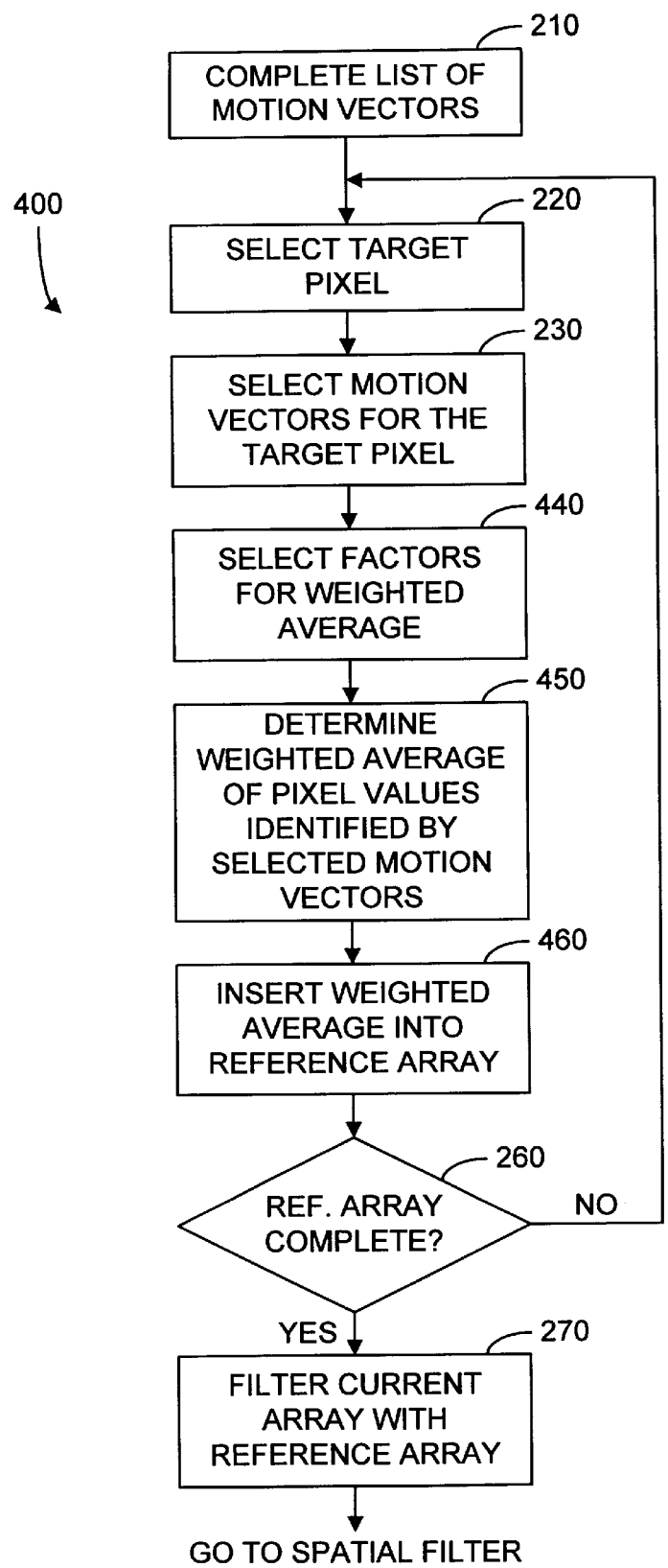
FIG. 4 shows a flow diagram for a motion compensated temporal filtering process in accordance with another embodiment of the invention.

FIG. 4 illustrates an alternative temporal filtering process 400 in accordance with the invention. Process 400 begins with the same steps 210, 220, and 230 described above in reference to FIG. 2. Step 210 completes the list 134 of motion vectors for macroblocks representing the current frame. Step 220 selects a target pixels in the current decoded frame, and step 230 selects a set of motion vectors from list 134 for the target pixel. The selected motion vectors include, for example, the motion vector for the block containing the target pixel, the motion vector for the nearest neighboring block to the left or right of the target pixel, the motion vector for the nearest neighboring block above or below the target pixel, and the motion vector for the nearest neighboring block at a diagonal with the block containing the target pixel. For example, referring to target pixel Pij in FIG. 3, step 230 selects motion vectors MV1, MV2, MV3, and MV4.

TABLE 2

Filter Function F (Δ,Q) of Difference Δ and Quantization Step Q

| Δ\Q | 1 | 2 | 3 | 4 | 5 | 6 | 7 | 8 | 9 | >9 |
|---|---|---|---|---|---|---|---|---|---|---|
| 0 | 0 | 0 | 0 | 0 | 0 | 0 | 0 | 0 | 0 | 0 |
| 1 | 0.29 | 0.34 | 0.39 | 0.44 | 0.49 | 0.54 | 0.59 | 0.64 | 0.69 | 0.74 |
| 2 | 0.44 | 0.52 | 0.59 | 0.67 | 0.74 | 0.81 | 0.89 | 0.96 | 1.04 | 1.11 |
| 3 | 0.87 | 1.01 | 1.16 | 1.30 | 1.45 | 1.59 | 1.74 | 1.88 | 2.03 | 2.17 |
| 4 | 1.16 | 1.36 | 1.55 | 1.75 | 1.94 | 2.14 | 2.33 | 2.53 | 2.72 | 2.92 |
| 5 | 1.34 | 1.57 | 1.79 | 2.01 | 2.24 | 2.46 | 2.69 | 2.91 | 3.14 | 3.36 |
| 6 | 1.53 | 1.79 | 2.04 | 2.30 | 2.56 | 2.81 | 3.07 | 3.33 | 3.58 | 3.84 |
| 7 | 1.73 | 2.02 | 2.30 | 2.59 | 2.88 | 3.17 | 3.46 | 3.75 | 4.04 | 4.32 |
| 8 | 1.93 | 2.25 | 2.57 | 2.90 | 3.22 | 3.54 | 3.86 | 4.19 | 4.51 | 4.83 |
| 9 | 2.11 | 2.47 | 2.82 | 3.17 | 3.52 | 3.88 | 4.23 | 4.58 | 4.94 | 5.29 |
| 10 | 2.32 | 2.71 | 3.10 | 3.49 | 3.88 | 4.27 | 4.65 | 5.04 | 5.43 | 5.82 |
| 11 | 2.08 | 2.43 | 2.78 | 3.13 | 3.48 | 3.83 | 4.17 | 4.52 | 4.87 | 5.22 |
| 12 | 1.89 | 2.21 | 2.52 | 2.84 | 3.16 | 3.47 | 3.79 | 4.10 | 4.42 | 4.74 |
| 13 | 1.69 | 1.97 | 2.25 | 2.53 | 2.81 | 3.10 | 3.38 | 3.66 | 3.94 | 4.22 |
| 14 | 1.48 | 1.72 | 1.97 | 2.22 | 2.47 | 2.71 | 2.96 | 3.21 | 3.45 | 3.70 |
| 15 | 1.30 | 1.52 | 1.74 | 1.95 | 2.17 | 2.39 | 2.61 | 2.82 | 3.04 | 3.26 |
| 16 | 1.11 | 1.30 | 1.49 | 1.67 | 1.86 | 2.05 | 2.23 | 2.42 | 2.61 | 2.80 |
| 17 | 0.93 | 1.09 | 1.24 | 1.40 | 1.55 | 1.71 | 1.86 | 2.02 | 2.18 | 2.33 |
| 18 | 0.74 | 0.87 | 0.99 | 1.12 | 1.24 | 1.37 | 1.49 | 1.62 | 1.74 | 1.87 |
| 19 | 0.56 | 0.65 | 0.75 | 0.84 | 0.94 | 1.03 | 1.12 | 1.22 | 1.31 | 1.41 |
| 20 | 0.37 | 0.44 | 0.50 | 0.56 | 0.63 | 0.69 | 0.75 | 0.82 | 0.88 | 0.94 |
| 21 | 0.19 | 0.22 | 0.25 | 0.29 | 0.32 | 0.35 | 0.38 | 0.42 | 0.45 | 0.48 |
| >21 | 0 | 0 | 0 | 0 | 0 | 0 | 0 | 0 | 0 | 0 |

The filter function coefficients and reference values can be stored using double precision, e.g. 16-bits of precision where 8 bits are normally used for pixel values to reduce rounding errors.

Figure 5:
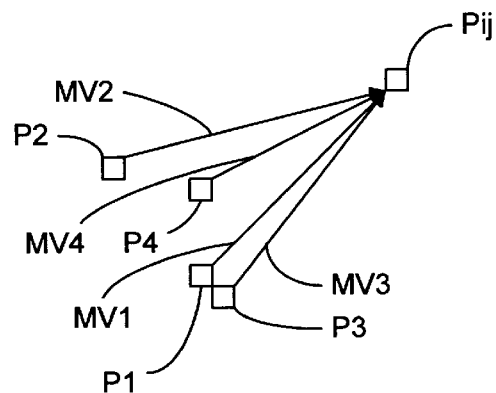
FIG. 5 illustrates pixel values from a prior frame that are combined to form a reference value for a target pixel in a current frame.

The exemplary embodiment of the temporal filtering process illustrated in FIG. 2 and described above may be varied in a number of ways in keeping with the invention. For example, step 230 may select more or fewer that four motion vectors per target pixel. In particular, step 230 could With one end at the target pixel, each of the selected motion vectors identifies a pixel value in the array representing the prior frame. FIG. 5 shows four pixels P1, P2, P3, and P4 which respective motion vectors MV1, MV2, MV3, and MV4 for target pixel Pij. The pixel values that the selected motion vectors identify in the prior frame are combined with the target pixel value in a filter operation. For process 400, the filter operation combines the target pixel value with a reference value that is a weighted average of the pixel values that the selected motion vectors identify. Step 440 selects the factors for the weighted average, and step 450 determines the weighted average that will be a reference value. For example, Equation 4 defines a reference value Rij for a target pixel Pij.

$$Rij = Aij*PA + Bij*PB + Cij*PC + Dij*PD \qquad \text{Equation 4}$$

In Equation 4, Aij, Bij, Cij, and Dij are the factors for the weighted average and may be, for example, as defined in Equation 2 above. PA, PB, PC, and PD are pixel values for the prior frame that motion vectors MVA, MVB, MBC, and MVD identify for target pixel value Pij. Motion vectors MVA, MVB, MBC, and MVD are the motion vectors respectively for the block containing the target pixel value, the nearest neighboring block to the left or right of the target pixel, the nearest neighboring block above or below the target pixel, and the nearest neighboring block at a diagonal with the block containing the target pixel. For target pixel Pij in quadrant 311 as illustrated in FIG. 3, the selected motion vectors MVA, MVB, MBC, and MVD are respectively motion vectors MV1, MV2, MBA, and MV4, and pixel values PA, PB, PC, and PD are pixel values P1, P2, P3, and P4 in the prior frame at positions illustrated in FIG. 5. Step 460 inserts the reference value Rij into the reference array. When the reference array is complete, step 270 combines current with the reference array in a filter operation such as defined by Equation 3 and Table 2 above. Alternatively, each pixel value Pij can be combined with reference values Rij as the reference values become available.

Figure 6:
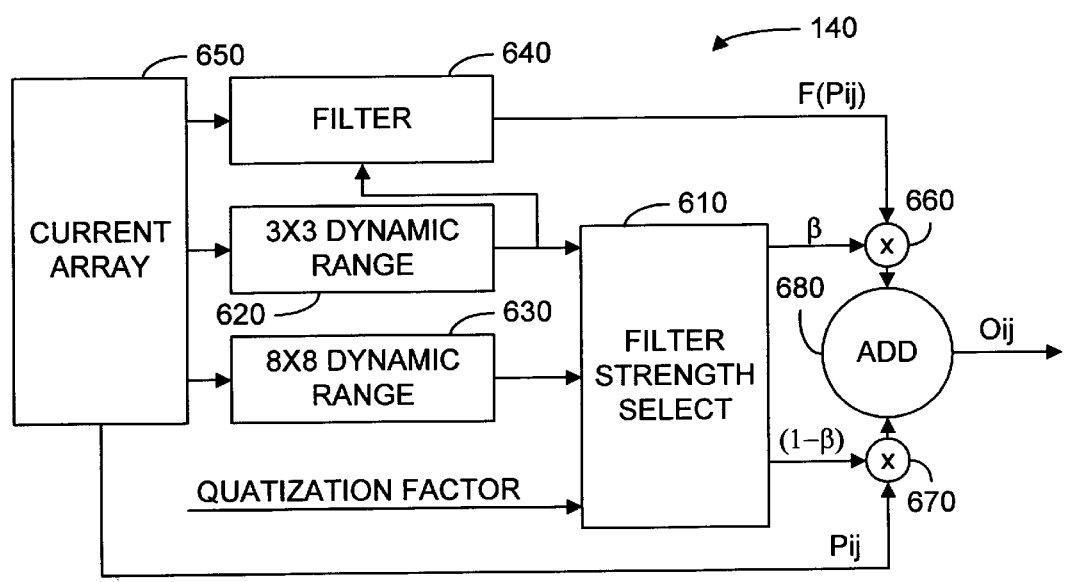
FIG. 6 shows a spatial adaptive filter in accordance with an embodiment of the invention.

After filtering every pixel in the current array, temporal filter 130 rounds the filtered current array to normal pixel value precision (e.g., 8-bits) and provides the rounded array to spatial adaptive filter 140. FIG. 6 illustrates an embodiment of spatial adaptive filter 140. Spatial adaptive filter 140 includes a filter strength select unit 610 that selects a filter strength for the filtering of each target pixel Pij from a current frame 650. Filter strength select unit 610 bases selection of the filter strength on a dynamic range DR3 of pixel values in a smaller block containing the target pixel, a dynamic range DR8 of pixel values in a larger block containing the target pixel, and the quantization step size MQUANT for the macroblock containing the target pixel. A dynamic range is the difference between the largest and the smallest pixel values in an area. In the embodiment of FIG. 6, the smaller block is a 3×3 block centered on the target pixel value, and the larger block is an 8×8 block that was subjected to a DCT during encoding. It has been found that similarities and differences between dynamic ranges DR3 and DR8 for the smaller and larger blocks suggest the image content of the area including and surrounding the target pixel. Filter select unit 610 selects a filter as appropriate for the image content suggested by the dynamic ranges. For example, a large dynamic range suggests that the associated block contains an edge of an object in the frame. The smaller block having a relatively small dynamic range DR3 and the larger block having a relatively large dynamic range DR8 suggests that the larger block contains an edge of an object and the smaller block is near but does not contain a portion of that edge. In this case, the target pixel is strongly filtered because coding artifacts are common near sharp edges within a block that has been DCT transformed. A 3×3 region containing a large dynamic range suggests that the target pixel is at the edge of an object. In this case the target pixel is weakly filtered to avoid blurring of the edge. Both dynamic ranges DR3 and DR8 being moderate suggests that the target pixel is part of texture in the image frame, and a weak filter is applied to the target pixel to avoid blurring the texture. Table 3 shows combinations of the dynamic ranges, the image content suggested by each combination, and the appropriate level of filtering for each combination.

TABLE 3

Filter Selection

| | DR8 is small | DR8 is moderate | DR8 is large |
|---|---|---|---|
| DR3 is small | Weak Filter: Target could be noise or detail | Medium Filter: Target likely noise on detail | Strong Filter: Target likely noise near an edge |
| DR3 is moderate | Very Weak Filter: | Weak Filter: Target likely image texture | Medium filter: Target could be noise or detail |
| DR3 is large | Very Weak Filter: | Very Weak Filter: | Weak Filter: Target likely at an edge |

The largest change between adjacent pixel values similarly measures image content, but determining the largest change is more complex than determining the dynamic range. To determine a dynamic range, units 620 and 630 determine the difference between the largest and smallest pixel values in respective 3×3 and 8×8 blocks. In the exemplary embodiment, each pixel value is an 8-bit value indicating the luma for a pixel so that the possible dynamic ranges are from 0 to 255. The dynamic range for the small block can be greater than the dynamic range for the larger block if the smaller block contains pixel values from outside the larger block.

To select the filter strength applied to a target pixel in the current frame, filter strength select unit 640 generates a parameter β, and the filter applied to a target pixel is of the form given in Equation 5.

$$Oij = \text{round\_and\_clip}((1-\beta)*Pij + \beta*F(Pij)) \qquad \text{Equation 5}$$

In Equation 5, Oij is the output pixel value from filter 140 for target pixel Pij, F(Pij) is the output pixel value of a spatial filter 640 in filter 140, and round_and_clip is a function that rounds its argument to the nearest integer and clips that result according to the range of allowed pixel value. Parameter β is restricted to a range from 0 to 1, where the strength of the filter increases with parameter β. For β equal to zero, output pixel value Oij is equal to target pixel Pij unfiltered. For β equal to one, output pixel value Oij is equal to the result F(Pij) from spatial filter 640.

Filter 640 can be any desired spatial filter. In an exemplary embodiment of the invention, spatial filter is a "5×5 like filter" that excludes from the filter operation pixel values that significantly differ from a target pixel value being filtered. Table 4 illustrates the filter coefficients for the exemplary embodiment of filter 640.

TABLE 4

Filter Coefficients *32

| | j-2 | j-1 | j | j + 1 | j + 2 |
|---|---|---|---|---|---|
| i-2 | 0 | 1 | 1 | 1 | 0 |
| i-1 | 1 | 2 | 2 | 2 | 1 |
| i | 2 | 2 | 2 | 2 | 2 |
| i + 1 | 1 | 2 | 2 | 2 | 1 |
| i + 2 | 0 | 1 | 1 | 1 | 0 |

F(Pij) is the sum of the product of the filter coefficients from Table 3 and pixel values. Each pixel value in a product is either the pixel value having a position relative to the target pixel as indicated for the filter coefficient in the product or the target pixel value if the pixel value in the position indicated for the filter coefficient differs from the target pixel value by more than a likeness threshold LT. For the exemplary embodiment, Equation 6 shows the dependence of likeness threshold LT on the dynamic range DR3 of the 3×3 block in the exemplary embodiment of the invention.

$$LT=10+0.625*DR3 \qquad \text{Equation 6}$$

Tables 5.1 and 5.2 below indicate the selection of parameter β for different values of dynamic ranges DR3 and DR8 and the macroblock quantization step size MQUANT. Table 5.1 indicates the values of parameter β when the quantization step size is six. For quantization step sizes MQUANT less than six the values in Table 5.1 are scaled by MQUANT/6.

TABLE 5.1

Parameter β for MQUANT = 6

| DR3 \ DR8 | <5 | <10 | <15 | <20 | <25 | <30 | <40 | <50 | <60 | <70 | <90 | <120 | <160 | <256 |
|---|---|---|---|---|---|---|---|---|---|---|---|---|---|---|
| <5   | .25 | .25 | .25 | .25 | .25 | .25 | .32 | .38 | .44 | 1  | 1  | 1  | 1  | 1  |
| <10  | .10 | .25 | .25 | .30 | .30 | .30 | .35 | .40 | .45 | 1  | 1  | 1  | 1  | 1  |
| <15  | .05 | .15 | .30 | .30 | .30 | .25 | .30 | .30 | .35 | .9 | 1  | 1  | 1  | 1  |
| <20  | 0   | 0   | .15 | .15 | .15 | .10 | .15 | .20 | .25 | .6 | .8 | 1  | 1  | 1  |
| <25  | 0   | 0   | 0   | 0   | 0   | 0   | .10 | .15 | .20 | .5 | .7 | .9 | 1  | 1  |
| <30  | 0   | 0   | 0   | 0   | 0   | 0   | .05 | .10 | .15 | .4 | .5 | .8 | .9 | 1  |
| <40  | 0   | 0   | 0   | 0   | 0   | 0   | 0   | .05 | .1  | .3 | .5 | .7 | .9 | .9 |
| <50  | 0   | 0   | 0   | 0   | 0   | 0   | 0   | 0   | 0   | .3 | .4 | .5 | .7 | .8 |
| <60  | 0   | 0   | 0   | 0   | 0   | 0   | 0   | 0   | 0   | .3 | .3 | .4 | .5 | .6 |
| <70  | 0   | 0   | 0   | 0   | 0   | 0   | 0   | 0   | 0   | .3 | .3 | .3 | .4 | .4 |
| <90  | 0   | 0   | 0   | 0   | 0   | 0   | 0   | 0   | 0   | .3 | .3 | .3 | .3 | .3 |
| <120 | 0   | 0   | 0   | 0   | 0   | 0   | 0   | 0   | 0   | .3 | .3 | .3 | .3 | .3 |
| <160 | 0   | 0   | 0   | 0   | 0   | 0   | 0   | .3  | .3  | .3 | .3 | .3 | .3 | 0  |
| <256 | 0   | 0   | 0   | 0   | 0   | 0   | 0   | 0   | .3  | .3 | .3 | .3 | .3 | 0  |

Table 5.2 indicates the values of parameter β, for average quantization greater than 10.

TABLE 5.2

Parameter β for MQUANT ≧11

| DR3 \ DR8 | <5 | <10 | <15 | <20 | <25 | <30 | <40 | <50 | <60 | <70 | <90 | <120 | <160 | <256 |
|---|---|---|---|---|---|---|---|---|---|---|---|---|---|---|
| <5   | .5 | .5 | .5 | .5 | .5 | .5 | .63 | .76 | .89 | 1  | 1  | 1  | 1  | 1  |
| <10  | .2 | .5 | .5 | .6 | .6 | .6 | .7  | .8  | .9  | 1  | 1  | 1  | 1  | 1  |
| <15  | .1 | .3 | .6 | .6 | .6 | .5 | .6  | .6  | .7  | .9 | 1  | 1  | 1  | 1  |
| <20  | .1 | .1 | .3 | .3 | .3 | .2 | .3  | .4  | .5  | .6 | .8 | 1  | 1  | 1  |
| <25  | .1 | .1 | .1 | .1 | .1 | .1 | .2  | .3  | .4  | .5 | .7 | .9 | 1  | 1  |
| <30  | .1 | .1 | .1 | .1 | .1 | .1 | .1  | .2  | .3  | .4 | .5 | .8 | .9 | 1  |
| <40  | .1 | .1 | .1 | .1 | .1 | .1 | .1  | .1  | .2  | .3 | .5 | .7 | .9 | .9 |
| <50  | .1 | .1 | .1 | .1 | .1 | .1 | .1  | .1  | .1  | .3 | .4 | .5 | .7 | .8 |
| <60  | .1 | .1 | .1 | .1 | .1 | .1 | .1  | .1  | .1  | .3 | .3 | .4 | .5 | .6 |
| <70  | .1 | .1 | .1 | .1 | .1 | .1 | .1  | .1  | .1  | .3 | .3 | .3 | .4 | .4 |
| <90  | .1 | .1 | .1 | .1 | .1 | .1 | .1  | .1  | .1  | .3 | .3 | .3 | .3 | .3 |
| <120 | .1 | .1 | .1 | .1 | .1 | .1 | .1  | .1  | .1  | .3 | .3 | .3 | .3 | .3 |
| <160 | .1 | .1 | .1 | ..1 | .1 | .1 | .1  | .1  | .1  | .3 | .3 | .3 | .3 | .3 |
| <256 | .1 | .1 | .1 | .1 | .1 | .1 | .1  | .1  | .1  | .3 | .3 | .3 | .3 | .3 |

For quantization step size MQUANT greater than 6 but less than 11, parameter β is determined by linear interpolation between a value from Table 5.1 and a value from Table 5.2.

The microfiche appendix contains a C-language program listing for a software embodiment of a postfilter in accordance with an exemplary embodiment of the invention.

Although the invention has been described with reference to particular embodiments, the description is only an example of the invention's application and should not be taken as a limitation. Various adaptations and combinations of features of the embodiments disclosed are within the scope of the invention as defined by the following claims.

We claim:

1. A method for improving appearance of a video image, comprising:

representing a first frame in the video image by a first array of pixel values and a second frame in the video image by a second array of pixel values;

selecting a plurality of motion vectors for a target pixel value in the first array, wherein each motion vector corresponds to a block of pixel values in the first array and identifies a block of pixel values in the second array;

determining a reference value for the target pixel value, wherein the reference value depends on the motion vectors selected for the target pixel value and one or more pixel values from the second array; and combining the target pixel value with the reference value in a filter operation that generates an output pixel value for a third array, the third array representing improved version of the first frame, wherein the output pixel value is equal to the target pixel value if a difference between the target value and the reference value is greater than a threshold value and is equal to a linear combination of the target pixel value and the reference value if the difference is not greater than the threshold value.

2. The method of claim 1, wherein selecting the motion vectors comprises:
   selecting a first motion vector that corresponds to a first block containing the target pixel value; and
   selecting a second motion vector that corresponds to a second block neighboring the first block.

3. The method of claim 2, wherein the second block abuts the first block, and of blocks that abut the first block, the second block has a boundary closest to the target pixel value.

4. The method of claim 3, wherein determining the reference value for the target pixel value comprises:
   combining the motion vectors selected for the target pixel value to generate a filter vector; and
   selecting as the reference value a pixel value in the second array, at a position offset from a position of the target pixel value by an amount indicated by the filter vector.

5. The method of claim 4, wherein combining the motion vectors comprises:
   selecting weighting factors that depend on the position of the target pixel value in the first array; and
   determining a weighted average of the motion vectors using the selected weighting factors.

6. The method of claim 3, wherein determining the reference value for the target pixel value comprises:
   for each of the motion vectors selected for the target pixel value, identifying a pixel value that is in the second array, at a position that is offset from a position corresponding to the target pixel value by an amount indicated by the motion vector; and
   combining the pixel values identified to determine the reference value for the target pixel value.

7. The method of claim 6, wherein combining the pixel values comprises:
   selecting weighting factors that depend on the position of the target pixel value in the first array; and
   determining a weighted average of the identified pixel values using the selected weighting factors.

8. The method of claim 1, wherein determining the reference value for the target pixel value comprises:
   combining the motion vectors selected for the target pixel value to generate a filter vector; and
   selecting as the reference value a pixel value from the second array, wherein the pixel value selected is in the second array, at a position that is offset from a position corresponding to the target pixel value by an amount indicated by the filter vector.

9. The method of claim 8, wherein combining the motion vectors comprises:
   selecting weighting factors that depend on the position of the target pixel value in the first array; and
   determining a weighted average of the motion vectors using the selected weighting factors.

10. The method of claim 1, wherein determining the reference value for the target pixel value comprises:
    for each of the motion vectors selected for the target pixel value, identifying a pixel value that is in the second array, at a position offset from a position corresponding to the target pixel value by an amount indicated by the motion vector; and
    combining the pixel values identified to determine the reference value for the target pixel value.

11. The method of claim 10, wherein combining the pixel values comprises:
    selecting weighting factors that depend on the position of the target pixel value in the first array; and
    determining a weighted average of the identified pixel values using the selected weighting factors.

12. The method of claim 1, further comprising decoding a bit stream representing the video image, wherein:
    the decoding exacts from the bit stream motion vectors that are required for further decoding of the bit stream; and
    selecting the plurality of motion vectors for the target pixel value comprises selecting a motion vector extracted from the bit stream.

13. The method of claim 12, wherein the bit stream is encoded according to a video standard selected from a group consisting of the MPEG-1 standard, the MPEG-2 standard, the H.261 standard, and the H.263 standard.

14. The method of claim 12, wherein decoding further includes determining a quantization factor from the bit stream.

15. The method of claim 1, further comprising for each pixel value in the first array, repeating the selecting, determining, and combining steps with the pixel value as the target pixel value.

16. A method for improving appearance of a video image, comprising:
    determining motion vectors for first areas in a first frame of the video image that is represented by a first array of pixel values, each motion vector corresponding to a first area in the first frame and a second area in a second frame, wherein image content of the second area in the second frame is similar to the image content of the first area in the first frame;
    determining for each pixel in the first frame a reference vector that is a combination of a motion vector for a first area containing the pixel and one or more of the motion vectors for adjacent first areas;
    generating a reference array containing reference values, wherein each reference value in the reference array is equal to the pixel value at a relative position in the second array that is offset from a position of the reference value by an amount indicated by the reference vector; and
    generating a filtered array representing an improved version of the first frame, wherein the filtered array contains pixel values that are combinations of pixel values from the first array and the reference values, and wherein each pixel value in the filtered array is equal to a corresponding pixel value in the first array if a difference between the corresponding value and a corresponding reference value in the reference array is greater than a threshold value and is equal to a linear combination of the corresponding pixel value and the corresponding reference value if the difference is not greater than the threshold value.

17. The method of claim 16, wherein determining reference vectors comprises combining of the motion vector for the first area containing the pixel and motion vectors for first areas that are nearest to the first area containing the pixel.

18. A method for improving appearance of an image, comprising:
    representing the image using a first array of pixel values;
    determining a first range for pixel values in a first block that is in the first array and includes a target pixel value;

determining a second range for pixel values in a second block that is in the first array and includes the target pixel value, wherein the second block is smaller than the first block;

selecting a spatial filter from a plurality of spatial filters, wherein the spatial filter is selected according to the first and second ranges; and applying the selected spatial filter to the target pixel value, wherein applying the selected spatial filter combines the target pixel value with surrounding pixel values in the first array to generate a corresponding pixel value in a second array representing the image.

19. The method of claim 18, wherein the second block is a 3×3 block of pixel values centered on the target pixel value.

20. The method of claim 19, further comprising performing an inverse frequency transformation on a block of transform coefficients to determine the pixel values in the first block.

21. The method of claim 18, wherein selecting the spatial filter comprises:

selecting a first spatial filter in response to the second range being greater than a first threshold value; and selecting a second spatial filter in response to the first range being greater than a second threshold and the second range being less than a third threshold, wherein the second spatial filter is stronger than first spatial filter.

22. The method of claim 18, for each pixel value in the first array, using that pixel value as the target pixel in a repetition of the steps of determining the first range, determining the second range, selecting a spatial filter, and applying the selected spatial filter.

23. The method of claim 18, wherein applying the selected spatial filter comprises:

identifying a likeness threshold that corresponds to the second range; and excluding from the combination that generates the corresponding pixel value any pixel values that differ from the target pixel value by more than the likeness threshold.

24. The method of claim 18, wherein selecting a spatial filter comprises selecting a filter strength parameter $\beta$ corresponding to the first and second ranges.

25. The method of claim 24, wherein:

the target pixel value is Pij;

the corresponding value is Oij and is determined from pixel values of the first array according to an equation Oij=(1−$\beta$)*Pij+$\beta$*F(Pij), where F(Pij) is a linear combination of one or more pixel values near the target pixel value in the first array.

26. The method of claim 25, wherein applying the selected spatial filter comprises identifying a likeness threshold that corresponds to the second range, and linear combination F(Pij) excludes pixel values that differ from the target pixel value by more than the likeness threshold.

27. A method for improving appearance of an image, comprising:

representing the image using a first array of pixel values;

determining a range of pixel values in a block that is in the first array and includes a target pixel value;

identifying a likeness threshold that corresponds to the range determined; and generating an output pixel value for a second array representing an improved-appearance version of the image, the output pixel value being a linear combination of the target pixel value and one or more pixel values of the first array, the linear combination excluding pixel values that differ from the target pixel by more than the likeness threshold.

28. The method of claim 27, wherein the likeness threshold is linearly related to the range.

29. A method for improving appearance of a video image, comprising:

decoding a signal to generate a first series of arrays of pixel values, wherein each array of pixel values represents a frame in the video image and comprises a set of blocks;

applying a block boundary filter to pixel values at boundaries of the blocks in the frames to generate a second series of arrays of pixel values, wherein applying the block boundary filter leaves unchanged pixel values that are not at a boundary of any of the blocks;

performing a temporal filtering operation that combines pixel values from different arrays in the second series to generate a third series of arrays of pixel values; and applying a spatial filter to the arrays in the third series to generate a fourth series of arrays representing the video image with improved appearance.

30. The method of claim 29, wherein the signal comprises a plurality of sets of transformation coefficients with each set corresponding to a different one of the blocks in the arrays of the first series, and decoding comprises for each set of transformation coefficients, performing an inverse transformation on the set of transformation coefficients to generate pixel values in the block corresponding to the set of transformation coefficients.

31. The method of claim 29, wherein applying the spatial filter comprises:

filtering each pixel value in an array using a filter that has an adjustable parameter; and altering the parameter according to content of an area in a frame that includes a pixel represented by a pixel value being filtered.

* * * * *